(12) United States Patent
Glugla et al.

(10) Patent No.: US 11,492,990 B2
(45) Date of Patent: Nov. 8, 2022

(54) METHOD AND SYSTEM FOR OPERATING AN ENGINE

(71) Applicant: Ford Global Technologies, LLC, Dearborn, MI (US)

(72) Inventors: Chris Glugla, Macomb, MI (US); Joseph N. Ulrey, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 17/065,380

(22) Filed: Oct. 7, 2020

(65) Prior Publication Data
US 2022/0106921 A1   Apr. 7, 2022

(51) Int. Cl.
| F02D 41/02 | (2006.01) |
| F02D 41/00 | (2006.01) |
| F02D 13/02 | (2006.01) |
| F02D 41/38 | (2006.01) |

(52) U.S. Cl.
CPC ..... F02D 41/0235 (2013.01); F02D 13/0234 (2013.01); F02D 13/0246 (2013.01); F02D 13/0261 (2013.01); F02D 41/009 (2013.01); F02D 41/38 (2013.01); *F02D 2041/389* (2013.01); *F02D 2200/0802* (2013.01); *F02D 2200/101* (2013.01); *F02D 2200/60* (2013.01)

(58) Field of Classification Search
CPC ............. F02D 13/0234; F02D 13/0246; F02D 13/0261; F02D 41/0235; F02D 41/009; F02D 41/38; F02D 2041/389; F02D 2200/0802; F02D 2200/101; F02D 2200/60
See application file for complete search history.

(56) References Cited

U.S. PATENT DOCUMENTS

| 8,843,259 B2 * | 9/2014 | Nakagawa | B60K 6/445 |
| | | | 701/99 |
| 9,604,634 B2 * | 3/2017 | Lee | F01N 3/20 |
| 2009/0120390 A1 * | 5/2009 | Ezaki | F02D 41/0005 |
| | | | 123/90.15 |
| 2017/0204761 A1 * | 7/2017 | Ulrey | F01N 9/002 |
| 2020/0011257 A1 * | 1/2020 | Stretch | F02D 41/0087 |

* cited by examiner

*Primary Examiner* — Audrey B. Walter
*Assistant Examiner* — Dapinder Singh
(74) *Attorney, Agent, or Firm* — Vincent Mastrogiacomo; McCoy Russell LLP (57) ABSTRACT

A method for operating an engine during a fuel cut-off mode is disclosed. The method may adjust exhaust valve opening timing and exhaust valve lift of one or more cylinders to heat air flowing through the one or more cylinders so that a temperature of an after treatment device may be maintained or increased.

19 Claims, 5 Drawing Sheets

METHOD AND SYSTEM FOR OPERATING AN ENGINE

FIELD

The present description relates to methods and a system for operating an engine in a fuel cut-off mode. The methods and systems may improve operation of engine after treatment devices.

BACKGROUND AND SUMMARY

An internal combustion engine of a vehicle may be operated at low loads from time to time when the vehicle is traveling on a road. During such conditions, cylinders of the engine may be deactivated by ceasing fuel flow to the cylinders. In addition, the intake and exhaust valves of the cylinders may be fully closed and held closed over an entire engine cycle (e.g., two revolutions for a four stroke engine) while the engine continues to rotate. Alternatively, the engine's intake valves and exhaust valves may continue to open and close while fuel flow to the engine cylinders is deactivated. By deactivating engine cylinders, engine fuel consumption may be reduced. Deactivating engine cylinders in this way may be referred to as operating the engine in a fuel cut-off mode.

Deactivating engine cylinders when engine load is low may conserve fuel; however, it may also cause temperatures and efficiencies of engine after treatment devices to be reduced. In particular, if the engine's intake valves and exhaust valves continue to open and close as if the engine where still combusting fuel, air flowing through the engine and exhaust system may cool the after treatment device so that its efficiency may be reduced. In addition, the air flow may saturate the engine exhaust after treatment devices with oxygen, thereby lowering the NOx conversion efficiency of the after treatment devices.

The inventors herein have recognized the above-mentioned issues and have developed an engine operating method, comprising: adjusting an exhaust valve opening timing and lift for a cylinder via a controller in response to an engine being in a fuel cut-off mode, where adjusting exhaust valve opening time includes opening the exhaust valve during a compression or expansion stroke of the cylinder, and where adjusting the exhaust valve lift includes reducing exhaust valve lift as compared to the exhaust valve lift when the cylinder is activated at the present engine speed and driver demand.

By adjusting an exhaust valve opening time and lift for a cylinder in response to an engine being in a fuel cut-off mode, it may be possible to provide the technical result of maintaining or increasing a temperature of an after treatment device. In particular, air flowing through the engine may be heated via being compressed and the heated air may be delivered to the after treatment system. In addition, a temperature of air flowing through the engine may be adjusted via controlling overlap between opening of an intake valve and opening of an exhaust valve. As a result, a small amount of air may heat the after treatment device while reducing air flow to the after treatment device as compared to if intake and exhaust valves of the cylinder were opening and closing at nominal timings and lifts.

The present description may provide several advantages. Specifically, the approach may improve after treatment device efficiency. In addition, the approach may maintain after treatment device temperature without the engine combusting fuel. Further still, the approach may reduce oxygen delivered to an after treatment device so that less fuel may be needed to reactivate the after treatment device.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
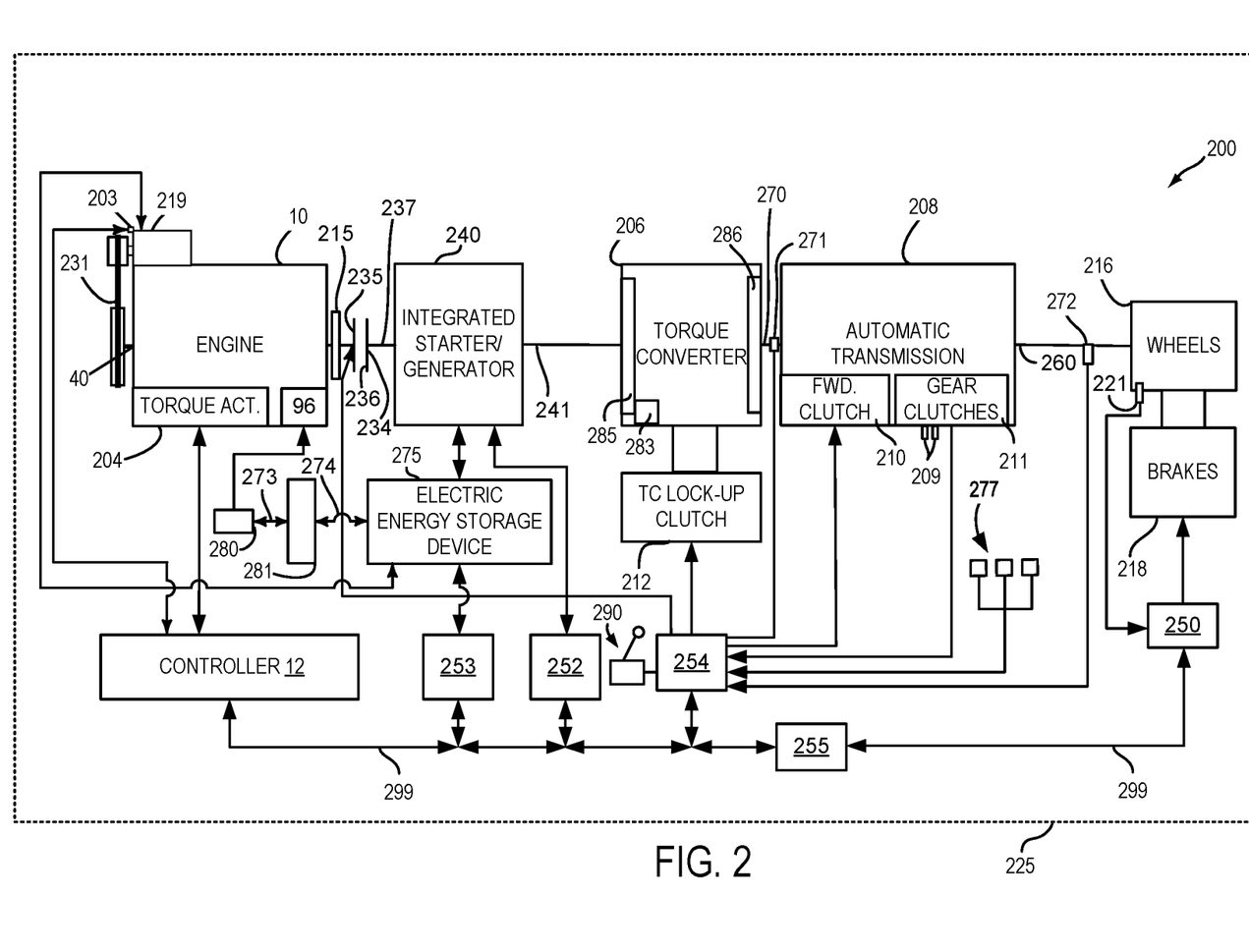
FIG. 2 shows a schematic diagram of a vehicle driveline or powertrain including the internal combustion engine shown in FIG. 1.
Figure 3A:
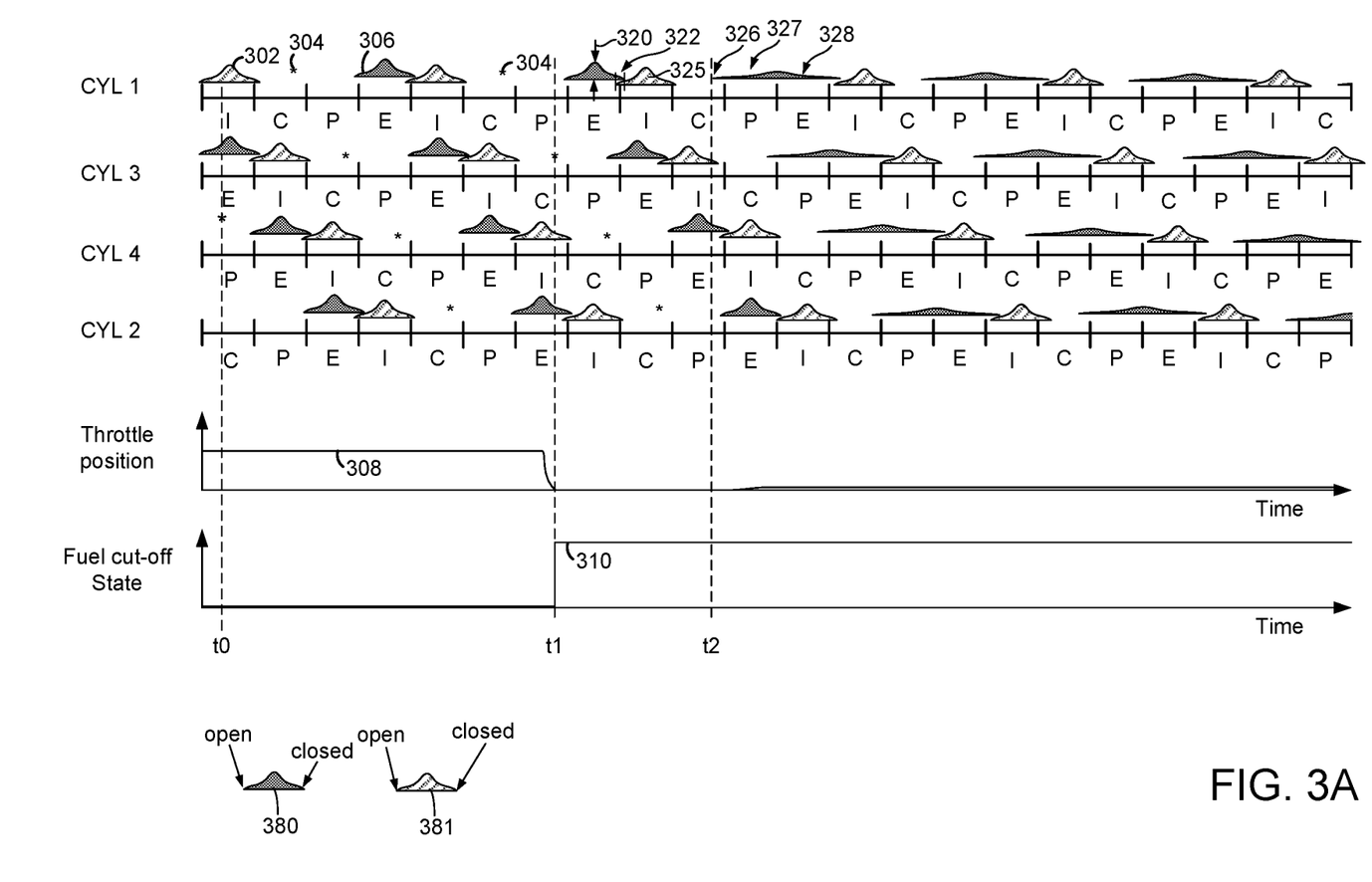
FIGS. 3A-3B show engine operating sequences while operating an engine in a fuel cut-off mode.
Figure 3B:
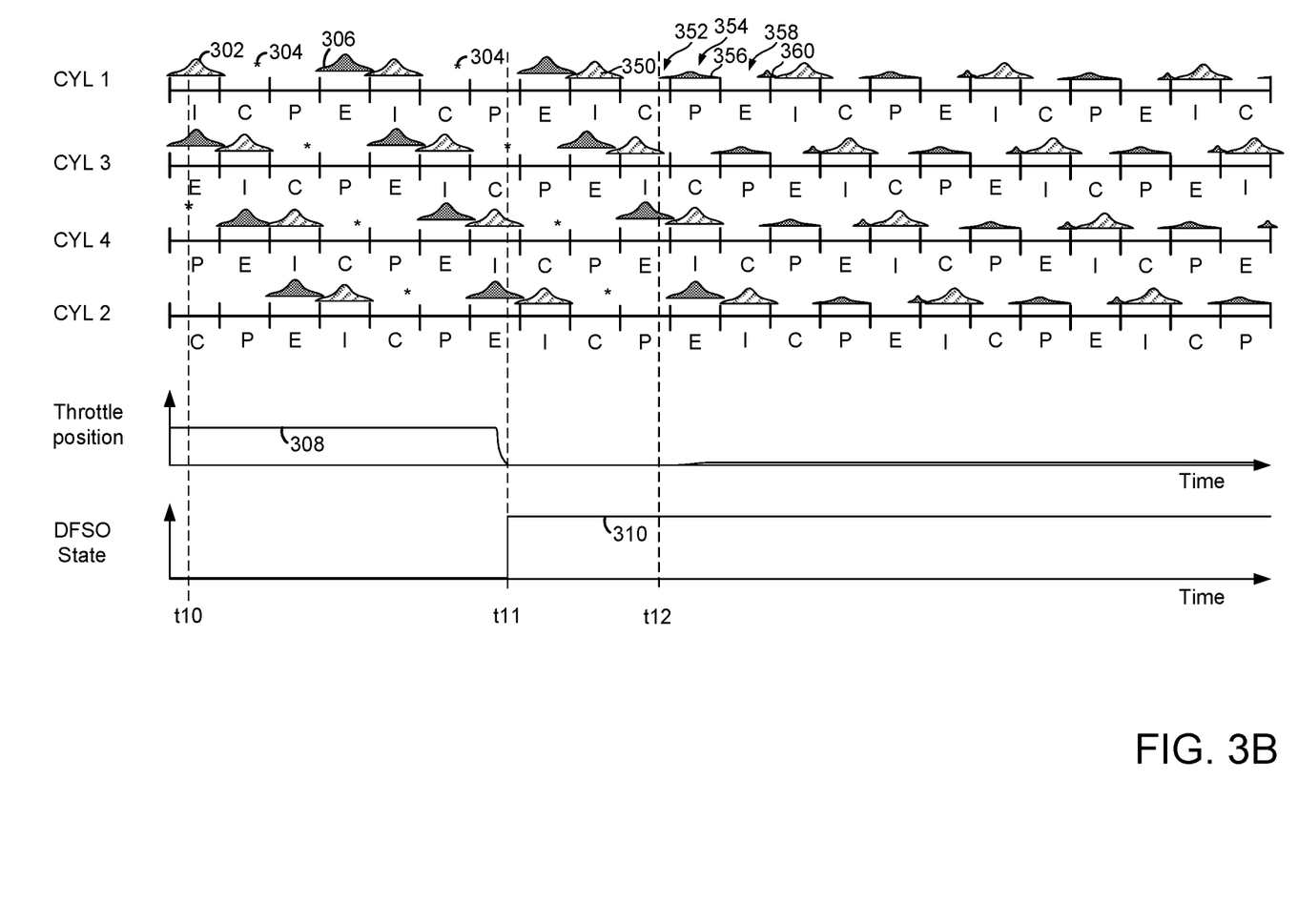

The present description is related to maintaining an operating temperature of an engine exhaust gas after treatment device. The engine may be of the type shown in FIG. 1. The engine may be included in a driveline or powertrain as shown in FIG. 2. The engine may be operated in a fuel cut-off mode as shown in FIGS. 3A and 3B to maintain a temperature of an after treatment device. In particular, exhaust valve opening timing and exhaust valve lift may be adjusted so that air that is pumped through a cylinder is heated via compression heating and exhausted to maintain or elevate a temperature of an after treatment device. In addition, the amount of air or the flow rate of air to the after treatment device may be controlled via adjusting a throttle opening amount and intake and exhaust valve overlap. The sequences of FIGS. 3A and 3B may be provided via the method of FIG. 4.

Figure 1:
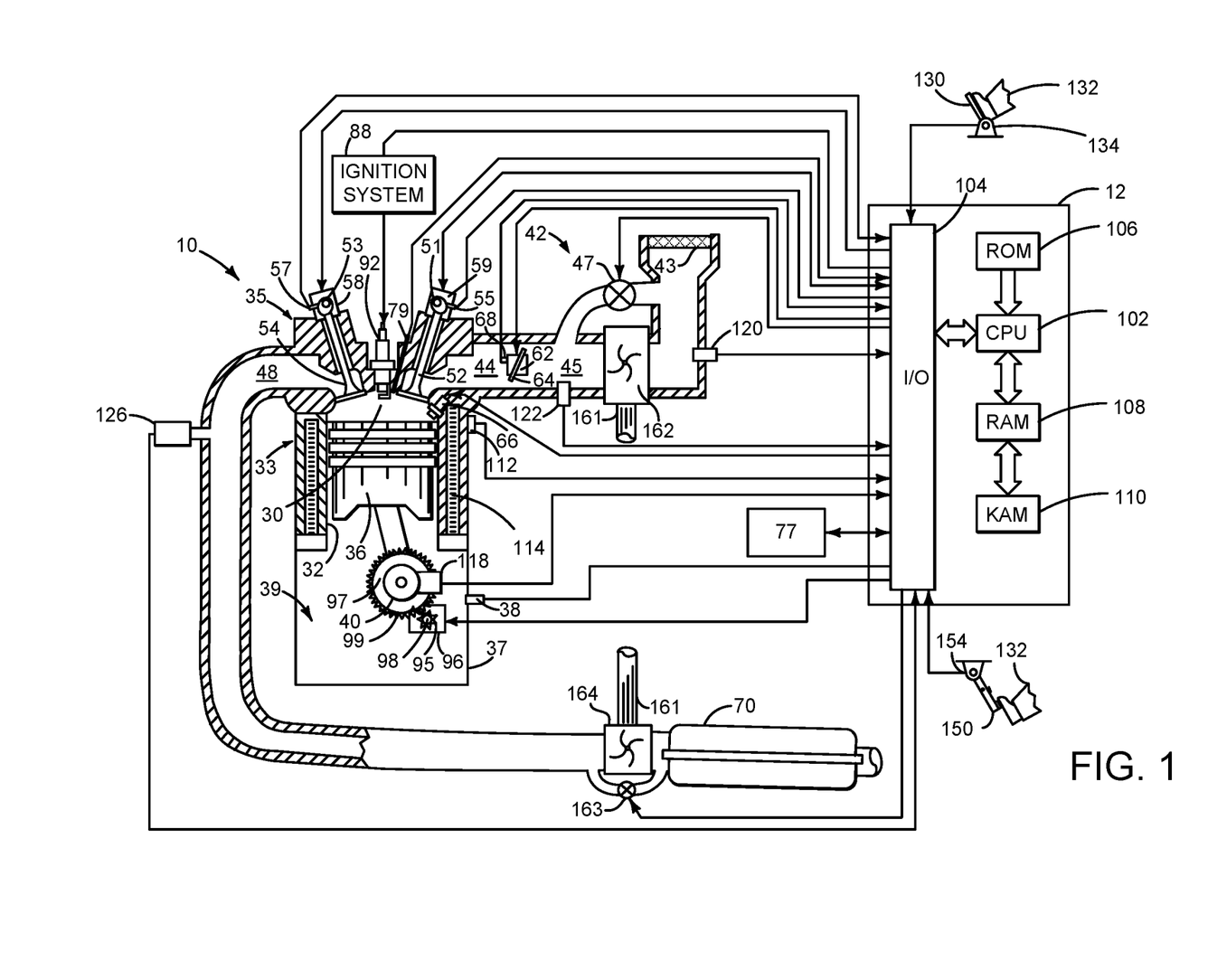
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Opening timing, closing timing, and lift of intake valve 52 may be adjusted relative to a position of crankshaft 40 and a fully closed intake valve position via continuously variable valve lift (CVVL) adjustment device 59. Opening timing, closing timing, and lift of exhaust valve 54 may be adjusted relative to a position of crankshaft 40 and a fully closed exhaust valve position via CVVL adjustment device 58. Valve phase changing devices 58 and 59 may be electro-mechanical devices, hydraulic devices, or mechanical devices. In one example, the exhaust valve and intake CVVL devices may be of the type shown in U.S. Pat. No. 7,869,929, which is hereby incorporated by reference for all purposes. Alternatively, the intake and exhaust valves may electrically operated as shown in U.S. Pat. No. 7,640,899, which is hereby incorporated by reference for all purposes.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gas after treatment device 70 may include multiple catalyst bricks, in one example. In another example, multiple emission control devices, each with multiple bricks, can be used. Converter 70 can be a three-way type catalyst in one example, or alternatively, a particulate filter.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsion effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 77. In one example, human/machine interface 77 may be a display panel. Alternatively, human/machine interface 77 may be a key switch or other known type of human/machine interface. Human/machine interface 77 may receive requests from a user. For example, a user may request an engine stop or start via human/machine interface 77. Additionally, human/machine interface 77 may display status messages and engine data that may be received from controller 77.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsive effort pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase speed of vehicle 225, vehicle system controller may obtain a driver demand power or power request from a propulsive effort pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then delivers at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to reduce speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed increase. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: an engine including a cylinder with variable a lift intake valve and a variable lift exhaust valve; and a controller including executable instructions stored in non-transitory memory that cause the controller to adjust a beginning of opening time of the variable lift exhaust valve and a beginning of opening time of the variable lift intake valve while fuel flow is cut-off to the cylinder in response to an exhaust after treatment device temperature that is less than a threshold temperature. The vehicle system further comprises additional instructions to fully close the variable lift intake valve and the variable lift exhaust valve in response to entering a fuel cut-off mode. The vehicle system includes where adjusting the beginning of opening time of the variable lift exhaust valve includes advancing the beginning of opening time of the variable lift exhaust valve relative to when the engine is combusting fuel at the engine's present speed and driver demand. The vehicle system includes where adjusting the beginning of opening time of the variable lift exhaust valve includes opening the exhaust valve during a compression or expansion stroke of the cylinder. The vehicle system further comprises reducing a lift amount of the variable lift exhaust valve relative to the lift amount of the variable lift exhaust valve when the engine is being supplied with fuel at a present engine speed and driver demand. The vehicle system further comprises additional instructions to adjust an amount of overlap between the variable lift intake valve and the variable lift exhaust valve. The vehicle system further comprises additional instructions to adjust the amount of overlap in response to the exhaust after treatment device temperature.

Referring now to FIG. 3A, a first example prophetic engine operating sequence is shown. The engine operating sequence may be generated via the system of FIGS. 1 and 2 in conjunction or in cooperation with the method of FIG. 4. The vertical lines at times t0-t2 show times of interest during the sequence. The plots of FIG. 3A are aligned in time and engine position.

The first plot from the top of FIG. 3A is a plot of intake and exhaust valve timing and lift for cylinder number one. The individual strokes of cylinder number one are indicated along the horizontal axis. In particular, intake strokes are indicated by "I," compression strokes are indicated by "C," power or expansion strokes are indicated by "P," and exhaust strokes are indicated by "E." Lift and timing profiles for intake valves are represented via slash shaded areas such as at 302. Lift and timing profiles for exhaust valves are represented via dot shaded areas such as at 306. Spark ignition events are indicates by * as shown at 306. Maximum lift for intake and exhaust valve profiles are indicated by the maximum height of the intake and exhaust valve profiles as indicated at 320. Intake and exhaust valve opening overlap occurs when the intake and exhaust valve lift profiles overlap as indicated between the vertical lines in the area 322 and similarly elsewhere in the figure. The vertical lines between the respective cylinder strokes along the horizontal axis represent top-dead-center and bottom-dead-center piston positions for cylinder number one.

The second plot from the top of FIG. 3A is a plot of intake and exhaust valve timing and lift for cylinder number three. Similar to cylinder number one, the individual strokes of cylinder number three are indicated along the horizontal axis. Further, the lift and timing profiles for intake valves are represented via slash shaded areas as previously described. In addition, the lift and timing profiles for exhaust valves are represented via dot shaded areas as previously described. Also, spark ignition events, maximum lift for intake and exhaust profiles, and intake and exhaust valve opening overlap are indicated as previously mentioned for cylinder number one. The vertical lines between the respective cylinder strokes along the horizontal axis represent top-dead-center and bottom-dead-center piston positions for cylinder number three.

The third plot from the top of FIG. 3A is a plot of intake and exhaust valve timing and lift for cylinder number four. Similar to cylinder number one, the individual strokes of cylinder number one are indicated along the horizontal axis. In addition, the lift and timing profiles for intake valves are represented via slash shaded areas as previously described. Further, the lift and timing profiles for exhaust valves are represented via dot shaded areas as previously described. Spark ignition events, maximum lift for intake and exhaust profiles, and intake and exhaust valve opening overlap are indicated as previously mentioned for cylinder number one. The vertical lines between the respective cylinder strokes along the horizontal axis represent top-dead-center and bottom-dead-center piston positions for cylinder number four.

The fourth plot from the top of FIG. 3A is a plot of intake and exhaust valve timing and lift for cylinder number two. Similar to cylinder number one, the individual strokes of cylinder number one are indicated along the horizontal axis. The lift and timing profiles for intake valves are represented via slash shaded areas as previously described. Likewise, the lift and timing profiles for exhaust valves are represented via dot shaded areas as previously described. Spark ignition events, maximum lift for intake and exhaust profiles, and intake and exhaust valve opening overlap are indicated as previously mentioned for cylinder number one. The vertical lines between the respective cylinder strokes along the horizontal axis represent top-dead-center and bottom-dead-center piston positions for cylinder number two.

The fifth plot from the top of FIG. 3A is a plot of engine throttle position versus time. The throttle opening amount increases in the direction of the vertical axis arrow. The horizontal axis represents a fully closed throttle; however, a small amount of air may pass the throttle when it is fully closed to permit engine idle. The horizontal axis represents time and time increases from the left side of the plot to the right side of the plot. Trace 308 represents the throttle position.

The sixth plot from the top of FIG. 3A is a plot of engine fuel cut-off state versus time. The vertical axis represents engine fuel cut-off state and the engine is not in fuel cut-off state when trace 310 is at a lower level near the horizontal axis. The engine is in a fuel cut-off state when trace 310 is at a higher level near the vertical axis arrow. The horizontal axis represents time. Trace 310 represents the engine fuel cut-off state.

An example exhaust valve timing and lift profile is shown at 380 and exhaust valve opening time for the exhaust valve timing and lift profile is indicated as "open." The exhaust valve closing time for the exhaust valve timing and lift profile is indicated as "closed." An example intake valve timing and lift profile is shown at 381 and intake valve opening time for the intake valve timing and lift profile is indicated as "open." The intake valve closing time for the intake valve profile is indicated as "closed." Exhaust valve open timing and closing timing for the profiles shown in FIG. 3A follow the same convention that is shown for exhaust valve timing and lift profile 380. Exhaust valve open timing and closing timing for the profiles shown in FIG. 3A follow the same convention that is shown for exhaust valve timing and lift profile 380.

At time t0, the engine is rotating and combusting fuel. The intake and exhaust valves are operating at nominal lift and timings for the present engine speed and load. All four engine cylinders are combusting air and fuel. The exhaust products of combustion are delivered to the engine's exhaust system. Shortly before time t1, the engine's throttle is fully closed.

At time t1, the engine enters fuel cut-off mode and fuel injection to engine cylinders ceases (not shown). Shortly after time t1, combustion of fuel that has been injected into cylinders 3, 4, and 2 completes.

At time t2, the opening of the exhaust valve for cylinder number one is advanced. In addition, the lift of the exhaust valve for cylinder number one is reduced from 10 millimeters to 2 millimeters, for example. Reducing the lift of the exhaust valve limits flow of air pumped out of the cylinder, which reduces the flow of uncombusted gasses and which would cool the catalyst. Shortly after time t2, the throttle is opened a small amount to control engine intake manifold pressure and air flow through the engine. The intake valve opening timing and intake and exhaust valve opening overlap may be adjusted to further adjust the air flow through the engine's cylinders. For example, advancing the timing that the intake valve begins to open and increasing intake and exhaust valve overlap may reduce the air flow rate through a cylinder.

Air that is inducted into cylinder number one at the time of intake valve lift profile 325 is compressed in compression stroke 326. Air in cylinder number one is heated a first time during compression stroke 326. A small amount of the air that is inducted into cylinder number one during the time of intake valve lift profile 326 is pushed into the exhaust manifold near the end of compression stroke 326. Air is drawn back into cylinder number one from the exhaust manifold during power stroke 327. Air in cylinder number one is heated a second time during exhaust stroke 328. Air heated during exhaust stroke 328 is ejected to the engine's exhaust manifold and the air flows to an after treatment device where it may maintain or raise a temperature of the after treatment device.

Intake and exhaust valve timing and lift profiles for cylinder numbers two, three, and four are similar to the intake and exhaust valve profiles for cylinder number one after time t2 as indicated. Thus, air flow through cylinder numbers two, three, and four is similar to that of cylinder number one and air is heated in these cylinders as described for cylinder number one.

In this way, air flowing into a cylinder may be heated twice during a cycle of the cylinder. The heated air may flow to an after treatment device where it may help to maintain a temperature of the after treatment device.

Referring now to FIG. 3B, a second example prophetic engine operating sequence is shown. The engine operating sequence may be generated via the system of FIGS. 1 and 2 in conjunction or in cooperation with the method of FIG. 4. The vertical lines at times t10-t12 show times of interest during the sequence. The plots of FIG. 3B are aligned in time and engine position.

The plots shown in FIG. 3B is similar to those shown in FIG. 3A. Therefore, for the sake of brevity the description of each plot will not be repeated. In addition, the intake and exhaust valve lift profiles for FIG. 3B follow the same convention as those shown in FIG. 3A. Intake and exhaust valve lifting and timing profiles 302 and 306 follow the same convention as discussed in the description of FIG. 3A. Ignition events are once again indicated via * as shown at 304.

At time t10, the engine is rotating and combusting fuel. The intake and exhaust valve are operating at nominal lift and timings for the present engine speed and load. All four engine cylinders are combusting air and fuel. The exhaust products of combustion are delivered to the engine's exhaust system. Shortly before time t11, the engine's throttle is fully closed.

At time t11, the engine enters fuel cut-off mode and fuel injection to engine cylinders ceases (not shown). Shortly after time t11, combustion of fuel that has been injected into cylinders 3, 4, and 2 completes.

At time t12, the opening of the exhaust valve for cylinder number one is advanced into compression stroke 352. This is the first of two exhaust valve opening events in the present cycle of the cylinder. In addition, the lift of the exhaust valve for cylinder number one is reduced from 10 millimeters to 2 millimeters, for example. Reducing the lift of the exhaust valve limits flow of air pumped out of the cylinder, which reduces mass flow of cooler uncombusted gases through the catalyst. The first of the two exhaust valve opening events closes at or near bottom dead center of power stroke 354. Shortly after time t12, the throttle is opened a small amount to control engine intake manifold pressure and air flow through the engine. The exhaust valve of cylinder number one may be held closed for between 140-180 crankshaft degrees during exhaust stroke 358. The exhaust valve opens a second time during the cylinder cycle (e.g., within four strokes) at a reduced lift level near top-dead-center (TDC) exhaust stroke (e.g., in a range of 40 degrees before TDC exhaust stroke to TDC exhaust stroke) and closes at TDC exhaust stroke or shortly thereafter (e.g., within 30 crankshaft degrees after TDC exhaust stroke).

Air that is inducted into cylinder number one at the time of intake valve lift profile 350 is compressed in compression stroke 326. Air in cylinder number one is heated a first time during compression stroke 352. A small amount of the air that is inducted into cylinder number one during the time of intake valve lift profile 350 is pushed into the exhaust manifold near the end of compression stroke 352. Air is drawn back into cylinder number one from the exhaust manifold during power stroke 354. Air in cylinder number one is heated a second time during exhaust stroke 358. Air heated during exhaust stroke 358 is ejected to the engine's exhaust manifold and the air flows to an after treatment device where it may maintain or raise a temperature of the after treatment device.

Intake and exhaust valve timing and lift profiles for cylinder numbers two, three, and four are similar to the intake and exhaust valve profiles for cylinder number one after time t12 as indicated. Thus, air flow through cylinder numbers two, three, and four is similar to that of cylinder number one and air is heated in these cylinders as described for cylinder number one.

In this way, air flowing into a cylinder may be heated twice during a cycle of the cylinder. The heated air may flow to an after treatment device where it may help to maintain a temperature of the after treatment device.

Figure 4:
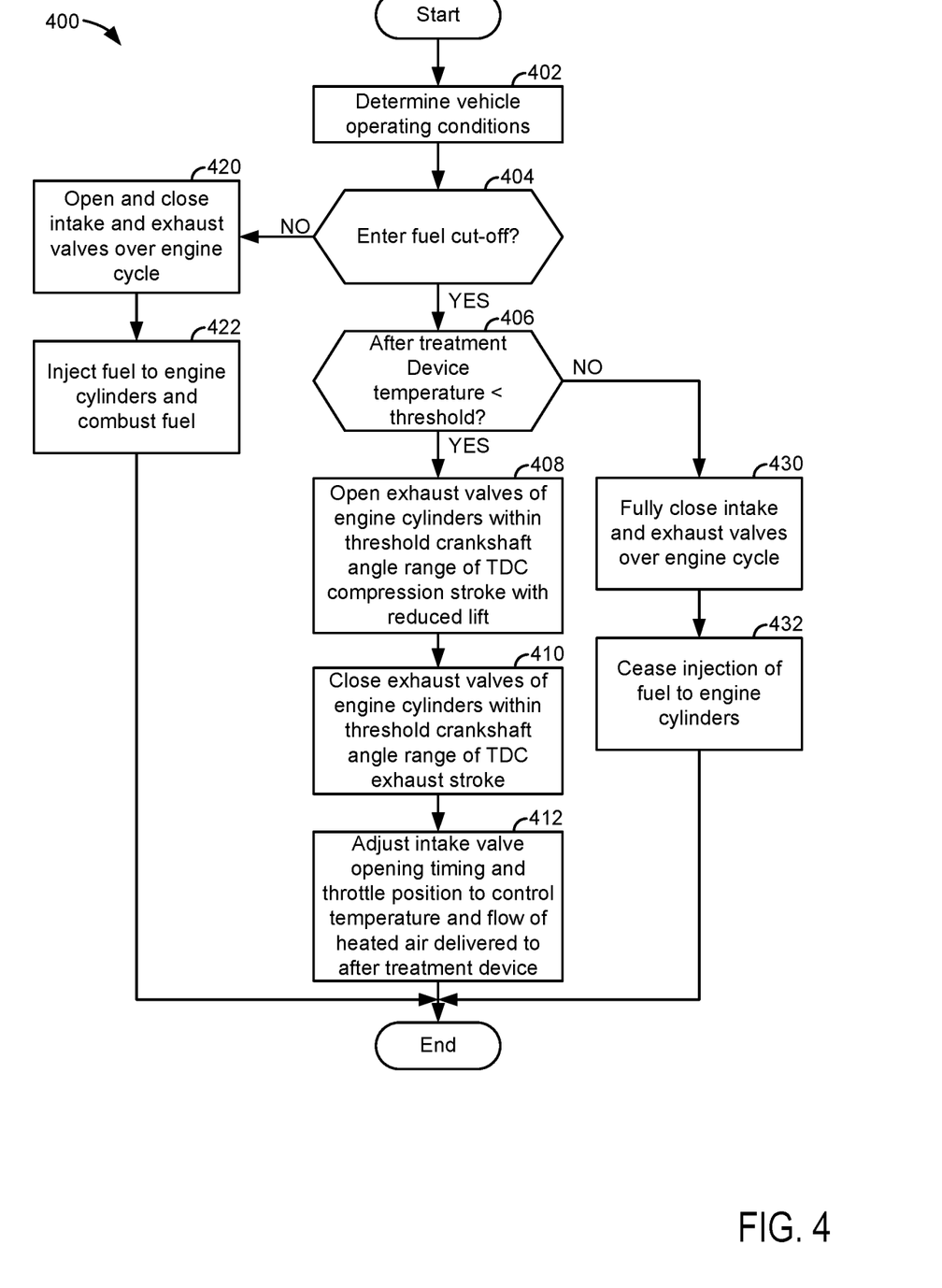
FIG. 4 shows an example method for operating an engine.

Referring now to FIG. 4, a method for operating an engine is shown. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device. The method of FIG. 4 may be incorporated into the system of FIGS. 1 and 2 as executable instructions stored in non-transitory memory. Method 400 is described in terms of operating one engine cylinder, but it should be appreciated that the engine's other cylinders may be operated similarly.

At 402, method 400 determines vehicle operating conditions. Vehicle operating conditions may include, but are not limited to vehicle speed, engine speed, selected transmission gear, ambient temperature, ambient pressure, and driver demand torque or power. The vehicle operating conditions may be determined via the sensors and actuators described herein. Method 400 proceeds to 404.

At 404, method 400 judges if the engine is to enter a fuel cut-off mode. The fuel cut-off mode may include rotating the engine via the vehicle's inertia while the engine is not supplied with fuel. Method 400 may judge that the engine is to enter the fuel cut-off mode if vehicle speed is greater than a threshold speed and driver demand torque or power is less than a threshold. If method 400 judges that the engine is to enter fuel cut-off mode, the answer is yes and method 400 proceeds to 406. Otherwise, the answer is no and method 400 proceeds to 420.

At 420, method 400 opens and closes intake and exhaust valves of engine cylinders over each engine cycle (e.g., as shown in FIG. 3A at time t0). The intake and exhaust valve timings and lifts may be adjusted as a function of engine speed and driver demand torque or power. The intake valves are opened and closed once per engine cycle. Likewise, the exhaust valves are opened and closed once per engine cycle. Method 400 proceeds to 422.

At 422, method 400 injects fuel to each of the engine's cylinders and combusts the fuel in the engine to generate torque to propel the vehicle. Method 400 proceeds to exit.

At 406, method 400 optionally determines if a temperature of an after treatment device is less than a threshold temperature. If method 400 judges that a temperature of the after treatment device is less than the threshold temperature, the answer is yes and method 400 proceeds to 408. Otherwise, the answer is no and method 400 proceeds to 430.

At 430, method 400 fully closes intake and exhaust valves of the engine's cylinders. The intake and exhaust valves are fully closed for more than an entire engine cycle (e.g., two engine revolutions for a four cycle engine). By closing the intake and exhaust valves, pumping of air from the engine's cylinders to an after treatment device may be reduced or eliminated. Method 400 proceeds to 432.

At 432, method 400 ceases to inject fuel to the engine's cylinders. By ceasing to inject fuel, combustion in the cylinders may be stopped and fuel consumption may be reduced. Method 400 proceeds to exit.

At 408, method 400 advances a beginning of exhaust valve opening timing during a cylinder cycle for all cylinders. In particular, the beginning of exhaust valve opening timing of a cylinder may be advanced into the compression stroke of the cylinder to within a threshold number of degrees of top-dead-center compression stroke (e.g., within 30 crankshaft degrees). Alternatively, the exhaust valve opening timing of the cylinder may be advanced into the early portion of the cylinder's expansion or power stroke. For example, the beginning of exhaust valve opening timing may be advanced to be within a predetermined crankshaft angle of top-dead-center expansion stroke (e.g., within 30 crankshaft degrees). In one example, the beginning of exhaust valve opening timing near TDC compression stroke may be a first of two exhaust valve openings, while in other examples, the exhaust valve opening may be the only exhaust valve opening during the cylinder cycle. Beginning of exhaust valve opening may be advanced in this way for each engine cylinder. Method 400 proceeds to 410.

At 410, method 400 closes the exhaust valve that opened in step 408. In one example, the exhaust valve may be fully closed near TDC exhaust stroke of the cylinder in the same cylinder cycle as shown in FIG. 3A. For example, the exhaust valve may be closed within +20 crankshaft degrees of TDC exhaust stroke of the cylinder. Exhaust valves of the engine's other cylinders may be operated in a similar way as shown in FIG. 3A. In a second example, the exhaust valve that opened at step 408 may be closed within +20 crankshaft degrees of bottom-dead-center power stroke of the same cylinder cycle as shown in FIG. 3B. The exhaust valves of the engine's other cylinders may be operated in a similar way.

In some examples, as shown in FIG. 3B, the exhaust valve may begin opening a second time late during the cylinder's exhaust cycle (e.g., within 40 crankshaft degrees of TDC exhaust stroke during the same cylinder cycle). The exhaust valve may be fully closed a second time within a predetermined actual total number of crankshaft degrees of TDC exhaust stroke. The second exhaust valve opening allows air that has been compressed and heated a second time during the cylinder cycle to be exhausted and delivered to the after treatment device. The exhaust valves of the engine's other cylinders may be operated in a similar way. Method 400 proceeds to 412.

At 412, method 400 adjusts the timing of beginning to open the cylinder's intake valve and the opening amount of the engine's throttle. In one example, the timing of beginning to open the cylinder's intake valve may be adjusted to increase or decrease opening time overlap between the exhaust valve and the intake valve as shown in FIGS. 3A and 3B. Further, the engine's throttle position may be adjusted to control the amount of air flow through the engine and to the after treatment device. For example, the timing of beginning to open the intake valve may be retarded to decrease opening time overlap with the exhaust valve to increase the air flow rate through the engine and cylinder. The amount of intake and exhaust valve opening time overlap may be increased in response to an after treatment device temperature being less than a threshold temperature. Further, the throttle opening amount may be increased in response to the after treatment device temperature being less than the threshold temperature. In addition, the opening timing of the intake valve may be adjusted to increase a temperature of air that is compressed in the cylinder in response to a temperature of an after treatment device. For example, the beginning of intake valve opening time may be retarded as a temperature of a after treatment device declines. Method 400 proceeds to exit.

Thus, the method of FIG. 4 provides for an engine operating method, comprising: adjusting an exhaust valve opening timing and lift for a cylinder via a controller in response to an engine being in a fuel cut-off mode, where adjusting exhaust valve opening time includes beginning to open the exhaust valve during a compression or expansion stroke of the cylinder, and where adjusting the exhaust valve lift includes reducing exhaust valve lift as compared to the exhaust valve lift when the cylinder is activated at the present engine speed and driver demand. The method includes where the adjusting exhaust valve lift includes reducing a maximum exhaust valve lift. The method includes where adjusting exhaust valve opening time includes beginning to open the exhaust valve within a predetermined crankshaft angle of top-dead-center compression stroke of the cylinder. The method includes where the predetermined crankshaft angle is within 30 crankshaft degrees of top-dead-center compression stroke of the cylinder. The method further comprises opening and closing an intake valve of the cylinder while the engine is in the fuel cut-off mode. The method further comprises adjusting opening timing of the intake valve to increase a temperature of air being pumped through the engine. The method further comprises adjusting opening timing of the intake valve to increase flow of air being pumped through the engine.

The method of FIG. 4 also provides for an engine operating method, comprising: opening and closing an exhaust valve of a cylinder twice during a cycle of an engine while operating the engine in a fuel cut-off mode in response to a temperature of an after treatment device being less than a threshold temperature. The method includes where the exhaust valve is opened a first time during a compression stroke or an expansion stroke of the cylinder. The method includes where the exhaust valve is opened a second time during an exhaust stroke of the cylinder. The method further comprises opening and closing an intake valve once during the cycle of the engine. The method further comprises adjusting an amount of overlap between the intake valve and the exhaust valve in response to a temperature of an after treatment device. The method further comprises reducing a lift amount of the exhaust valve in response to operating the engine in the fuel cut-off mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
adjusting an exhaust valve opening timing and lift for a cylinder via a controller in response to an engine being in a fuel cut-off mode and a present engine speed, where adjusting exhaust valve opening time includes beginning to open the exhaust valve during a compression stroke of the cylinder, and where adjusting the exhaust valve lift includes reducing exhaust valve lift as compared to the exhaust valve lift when the cylinder is activated at the present engine speed and driver demand.

2. The method of claim 1, where the adjusting exhaust valve lift includes reducing a maximum exhaust valve lift.

3. The method of claim 1, where adjusting exhaust valve opening time includes beginning to open the exhaust valve within a predetermined crankshaft angle of top-dead-center compression stroke of the cylinder.

4. The method of claim 3, where the predetermined crankshaft angle is within 30 crankshaft degrees of top-dead-center compression stroke of the cylinder.

5. The method of claim 1, further comprising opening and closing an intake valve of the cylinder while the engine is in the fuel cut-off mode.

6. The method as claimed in claim 1, further comprising adjusting opening timing of the intake valve to increase a temperature of air being pumped through the engine.

7. The method of claim 1, further comprising adjusting opening timing of the intake valve to increase flow of air being pumped through the engine.

8. A vehicle system, comprising:
an engine including a cylinder with variable a lift intake valve and a variable lift exhaust valve; and
a controller including executable instructions stored in non-transitory memory that cause the controller to adjust a beginning of opening time of the variable lift exhaust valve and a beginning of opening time of the variable lift intake valve at a present engine speed and driver demand while fuel flow is cut-off to the cylinder in response to an exhaust after treatment device temperature that is less than a threshold temperature.

9. The vehicle system of claim 8, further comprising additional instructions to fully close the variable lift intake valve and the variable lift exhaust valve in response to entering a fuel cut-off mode.

10. The vehicle system of claim 8, where adjusting the beginning of opening time of the variable lift exhaust valve includes advancing the beginning of opening time of the variable lift exhaust valve relative to when the engine is combusting fuel at the engine's present speed and driver demand.

11. The vehicle system of claim 8, where adjusting the beginning opening time of the variable lift exhaust valve includes opening the exhaust valve during a compression or expansion stroke of the cylinder.

12. The vehicle system of claim 8, further comprising reducing a lift amount of the variable lift exhaust valve relative to the lift amount of the variable lift exhaust valve when the engine is being supplied with fuel at a present engine speed and driver demand.

13. The method of claim 12, further comprising adjusting an amount of overlap between the intake valve and the exhaust valve in response to a temperature of an after treatment device.

14. The method of claim 13, further comprising reducing a lift amount of the exhaust valve in response to operating the engine in the fuel cut-off mode.

15. The vehicle system of claim 8, further comprising additional instructions to adjust an amount of opening overlap between the variable lift intake valve and the variable lift exhaust valve.

16. The vehicle system of claim 15, further comprising additional instructions to adjust the amount of opening overlap in response to the exhaust after treatment device temperature.

17. An engine operating method, comprising:
opening and closing an exhaust valve of a cylinder twice during a cycle of an engine while operating the engine in a fuel cut-off mode in response to a temperature of an after treatment device being less than a threshold temperature, where the exhaust valve is opened a first time during the cycle of the engine during a compression stroke or an expansion stroke of the cylinder.

18. The method of claim 17, where the exhaust valve is opened a second time during an exhaust stroke of the cylinder.

19. The method of claim 17, further comprising opening and closing an intake valve once during the cycle of the engine.

* * * * *